March 16, 1954 — J. B. LINGARD — 2,671,977
ROAD MAP SUPPORT FOR MOTOR VEHICLES
Filed Aug. 23, 1952
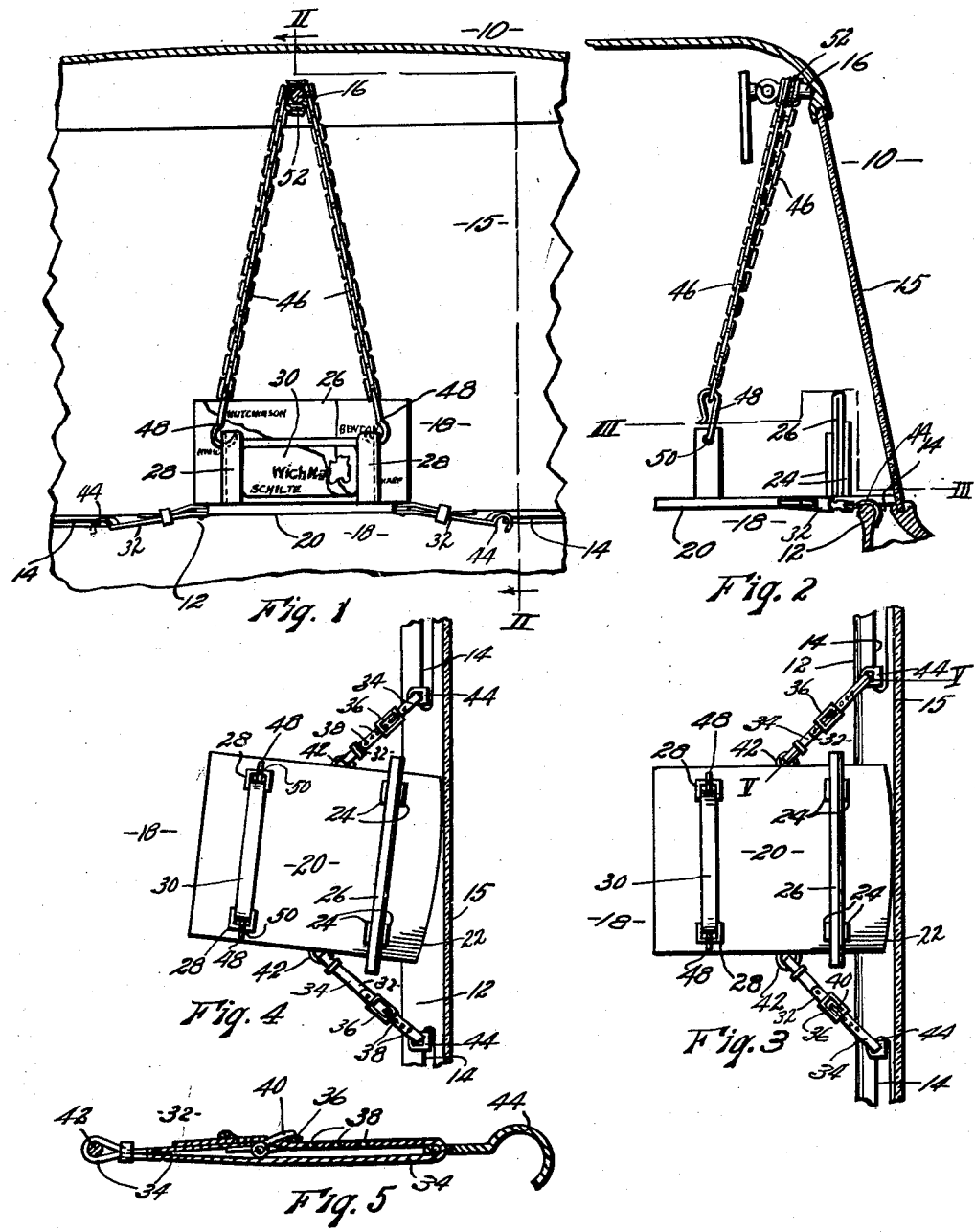
INVENTOR,
James B. Lingard.
BY Hamilton & Hamilton
Attorneys.

Patented Mar. 16, 1954

2,671,977

UNITED STATES PATENT OFFICE 2,671,977

ROAD MAP SUPPORT FOR MOTOR VEHICLES

James B. Lingard, Kansas City, Mo.

Application August 23, 1952, Serial No. 306,031

5 Claims. (Cl. 40—10)

1

This invention relates to new and useful improvements in road map supports for motor vehicles, and has as its principal object the provision of a road map support adjustable for clear vision for any of the occupants of the front seat of the vehicle.

Another object of the present invention is the provision of a map support provided with a magnifying glass adapted to be focused on that portion of the map being used.

A further object is to provide a device in which a map or other printed material may be readily inserted, and from which said material may be easily removed for reversal and readjustment, as the course of the vehicle progresses.

Other objects are simplicity and economy of construction, ease and efficiency of operation, and adaptability for use in most automobiles now in general use.

With these objects in view, as well as other objects which will appear in the course of the specification, reference will be had to the drawing, wherein:

Fig. 1 is an inside fragmentary view of an automobile structure showing structural parts of the automobile with a map support embodying the present invention mounted thereon.

Fig. 2 is a fragmentary sectional view taken on line II—II of Fig. 1.

Fig. 3 is a horizontal sectional view of the device taken on line III—III of Fig. 2.

Fig. 4 is a view similar to that shown in Fig. 3, with the base plate shown in tilted position relative to the windshield.

Fig. 5 is an enlarged longitudinal sectional view taken on line V—V of Fig. 3.

Throughout the several views like numerals refer to similar parts, and the numeral 10 designates a motor vehicle having an instrument panel 12 provided with the conventional defrosting openings or air vents 14 formed therein, a windshield 15, and a rear vision mirror bracket 16 above the windshield.

The map support 18 comprises a substantially horizontally disposed base plate 20 having a convexly curved forward edge 22 adapted to contact the windshield 15 while resting on the instrument panel 12. This form of base plate with the attaching parts hereinafter described provides for the desired adjustment of the map support to accommodate the line of vision of the person reading the map. At times some occupant of the front seat other than the driver will check the map and give the desired information to the driver. In such cases it is necessary to properly adjust the map support to the line of vision of the person doing the reading.

Mounted on base plate 20 adjacent convex end 22 thereof are two pairs of spaced apart standards 24 adapted to support a folded map 26 therebetween at substantially right angles to said base plate. The rearward post of each pair of standards is shorter than the forward standard to facilitate easy insertion of the map therebetween. Attached to base plate 20 adjacent the rear end thereof are a pair of transversely spaced apart channel-formed posts 28 adapted to receive a framed magnifying glass 30 therebetween in parallel relation to map 26. Map 26 is folded and exposes only a portion of the map, however it can be refolded to expose any desired part of the map.

Adjustable members 32 for securing the base plate 20 against the windshield 15 each comprises a longitudinally folded strap member 34 carrying a buckle 36 at one end and having its other end portion perforated at 38 to receive the tongue 40 of buckle 36. One fold of strap 34 passes through an eye 42 integral with base plate 20 and its other fold receives a hook member 44 which is adapted to engage in the defrosing opening 14 to hold the parts in operable relation. It is quite apparent that many other suitable means might be use to hold the parts in proper relation.

For adjustably supporting the rear end of base plate 20 a chain 46 is provided. This chain has a hook member 48 at each of its opposite ends, which engage in holes 50 formed adjacent the upper ends of channel posts 28. The body of chain 46 is placed over bracket 16 to support the base plate at the proper level. If it is desired to raise the plate to a different angle to suit the line of vision of the driver, an extra loop 52 of the chain may be wrapped about bracket 16. While I have shown and described one means for adjustably supporting the rear end portion of base plate 20, it is desired not to be limited to this particular means, since it is apparent that other suitable means might be substituted therefor.

What I claim as new and desire to protect by Letters Patent is:

1. A map support adapted for use in a motor vehicle having a vented instrument panel, a windshield, and a rear vision mirror bracket, said map support comprising a base plate having convex front edge adapted to contact said windshield when supported on said vented instrument panel, a pliable member attached to the rear end portion of said base plate and adapted to be attached to said rear vision mirror bracket, and adjustable means respectively connecting the opposite sides of said base plate to said panel whereby said base plate may be tilted to various positions relative to said windshield, and standards fixed on said base plate to receive a map and a magnifying glass in spaced apart operative relation.

2. A map support adapted for use in a motor vehicle having a vented instrument panel, a windshield, and a rear vision mirror bracket, said map support comprising a planar base having upstanding standards adapted to support a map and a magnifying glass in spaced apart operative relation, said planar base having a forward convex edge adapted to contact said windshield as the forward end portion of said base plate rests on said vented panel, flexible supporting means connected to the rear portion of said base plate and attachable to said rear vision mirror bracket, and means connecting said base to said vented panel whereby the base is horizontally tiltable relative to said windshield.

3. A map support adapted for use in a motor vehicle having a vented instrument panel, a windshield, and a rear vision mirror bracket, said map support comprising a rigid base plate having a convex forward edge and having upstanding brackets thereon to support a map and a magnifying glass in substantially parallel spaced apart relation, said base plate being adapted to rest on said instrument panel with its convex edge resting against said windshield, adjustable pliable means adapted to connect the rear end portion of said base plate to said rear vision mirror bracket, and diagonally disposed members of adjustable length adapted to connect the opposite sides of said base plate to said vented panel at points spaced outward from said base plate, whereby said base plate is transversely tiltable relative to the windshield.

4. A map support adapted for use in a motor vehicle having a vented instrument panel, a windshield and a rear vision mirror bracket, said map support comprising a base plate having a convex forward edge resting against said windshield and having brackets to support a map and a magnifying glass thereon, diagonally disposed members connecting the opposite sides of said base plate to said instrument panel, said diagonal members being longitudinally adjustable whereby said base plate is transversely adjustable for angular relation to said windshield, and a pliable member secured at its opposite ends to the rear end of said base plate, and adapted to be wrapped about said rear vision mirror bracket, whereby the rear end of said base plate is vertically adjustable.

5. A map support for use in a motor vehicle having a vented instrument board, a windshield and a rear vision mirror bracket, said map support comprising a planar base member having upstanding standards adapted to support removably a map and a magnifying glass in substantially parallel operative relation, said base plate having a convex-arcuate front edge adapted to contact said windshield with the front portion of said base plate resting on said panel, and its rear end portion suspended from said mirror bracket for vertical adjustment, and adjustable means interconnecting the opposite sides of said base member to said vented panel whereby the base member is transversely tiltable relative to said windshield.

JAMES B. LINGARD.

References Cited in the file of this patent
UNITED STATES PATENTS

| Number | Name | Date |
|---|---|---|
| 858,112 | Smart | June 25, 1906 |
| 1,773,337 | Barlow | Aug. 19, 1930 |
| 1,989,454 | Koster | Jan. 29, 1935 |